United States Patent [19]
Lute

[11] 3,750,130

[45] July 31, 1973

[54] ELECTRICAL INDICATOR

[76] Inventor: Lawrence R. Lute, 2511 E. 29th St., Lorain, Ohio 44055

[22] Filed: Nov. 17, 1971

[21] Appl. No.: 199,696

[52] U.S. Cl.............. 340/267 C, 340/259, 340/271, 340/282, 340/407
[51] Int. Cl. ............................................. G08b 7/06
[58] Field of Search.................... 340/271, 282, 259, 340/267 C

[56] References Cited
UNITED STATES PATENTS

| | | | |
|---|---|---|---|
| 2,717,993 | 9/1955 | Newsom .............................. | 340/271 |
| 2,922,994 | 1/1960 | Kennedy ......................... | 340/282 X |
| 3,195,120 | 7/1965 | Lazecki............................ | 340/271 X |
| 2,761,126 | 8/1956 | Morsching ........................... | 340/271 |
| 3,138,966 | 6/1964 | Kempf et al. ................. | 340/271 UX |

Primary Examiner—David L. Trafton
Attorney—Alexander B. Blair

[57] ABSTRACT

An electrical indicator for indicating increments of cable wound or unwound from a hoisting drum. A cam operated switch is associated with the hoisting drums so that the switch is closed once each revolution of the cam. The switch is wired into a circuit so as to ring a bell each time it is closed with the bell being wired into a circuit to cause the light to light and an electrical vibrator to vibrate each time the bell rings so that the operator of the equipment has a visual indication, an audible indication, and an indication for the sense of touch. A plurality of switches are provided which can be switched into the circuit so that a plurality of indications are given on each rotation of the cam.

3 Claims, 8 Drawing Figures

INVENTOR.
LAWRENCE R. LUTE
BY
Alexander R. Blair
ATTORNEY.

INVENTOR.
LAWRENCE R. LUTE
BY
Alexander B. Blair
ATTORNEY.

INVENTOR.
LAWRENCE R. LUTE
BY
Alexander G. Blair
ATTORNEY.

ELECTRICAL INDICATOR

BACKGROUND OF THE INVENTION

Field of the Invention

The present invention relates to electrical indicators for cable operated equipment.

SUMMARY OF THE INVENTION

Electrical indicator for indicating the movement of cable onto and off of a winding drum. Visual, audible, and tactile indications are given to be sure that the operator is aware of the indication.

The primary object of the invention is to provide an electrical indicator which can be seen, heard and felt to indicate the amount of cable being wound or unwound from the drum.

Other objects and advantages will become apparent in the following specification when considered in the light of the attached drawings.

DESCRIPTION OF THE PREFERRED EMBODIMENTS

Figure 3:
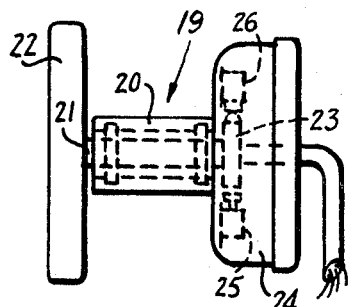
FIG. 3 is a side elevation of the switch operator.

Referring now to the drawings in detail wherein like reference characters indicate like parts throughout the several figures the reference numeral 10 indicates generally an electric indicator constructed in accordance with the invention.

The electrical indicator 10 is adapted for use with any type of cable actuated equipment such as the crane generally indicated at 11. The crane 11 has a cable winding drum 12 forming part thereof and having a cable 13 extending outwardly therefrom over a pulley 14 mounted on a boom 15. A load 16 is illustrated on the free end of the cable 13 and is being lowered to a position obscured by a wall 17. The operator of the crane 11 is completely unable to determine the position of the load 16 with respect to the surface 18 on which it is to be placed and must rely solely on hand signals from a conveniently positioned assistant.

A cam switch unit generally indicated at 19 includes a shaft support 20 secured to the crane 11 and having a shaft 21 journaled therein. A drive wheel 22 is secured on one end of the shaft 21 and engages the side of the winding drum 12 so as to rotate the shaft 21 as the winding drum 12 rotates. A cam 23 is secured to the other end of the shaft 21 and is positioned in a housing 24. A plurality of normally open switches 25, 26, 27 and 28 are positioned in the housing 24 in equispaced relation around the cam 23 for sequential actuation by the cam 23 upon rotation thereof.

Figure 5:
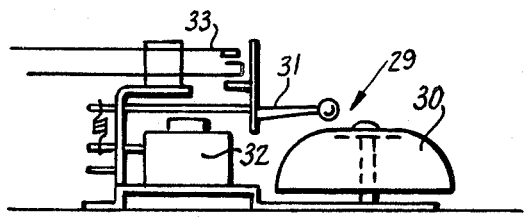
FIG. 5 is a side elevation of the signal bell and circuit switch used therewith.

In FIG. 5 an electric bell generally indicated at 29 is provided for an audible signal as required. The electric bell 29 includes a bell sounding portion 30, a clapper 31, an electromagnet 32 and a breaker switch 33 actuated by the clapper 31.

Figure 4:
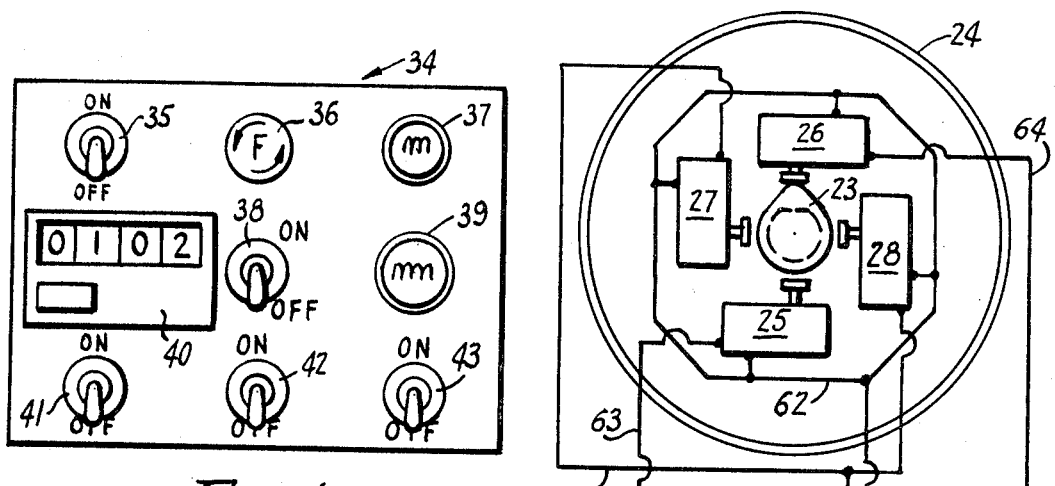
FIG. 4 is a front elevation of the control panel.

A control panel generally indicated at 34 is illustrated in FIG. 4 and includes a switch 35 for turning the electrical indicator on and off. A fuse 36 is provided in the system to protect the electric components thereof. A signal light 37 is lit any time the switch 35 is closed to indicate that the system is in operation. A switch 38 controls the operation of an indicator light 39. A counter 40 is controlled by a switch 41 to be in or out of the circuit as desired. A switch 42 activates the cam operated switch 26 and a switch 43 actuates the cam operated switches 27, 28.

Figure 2:
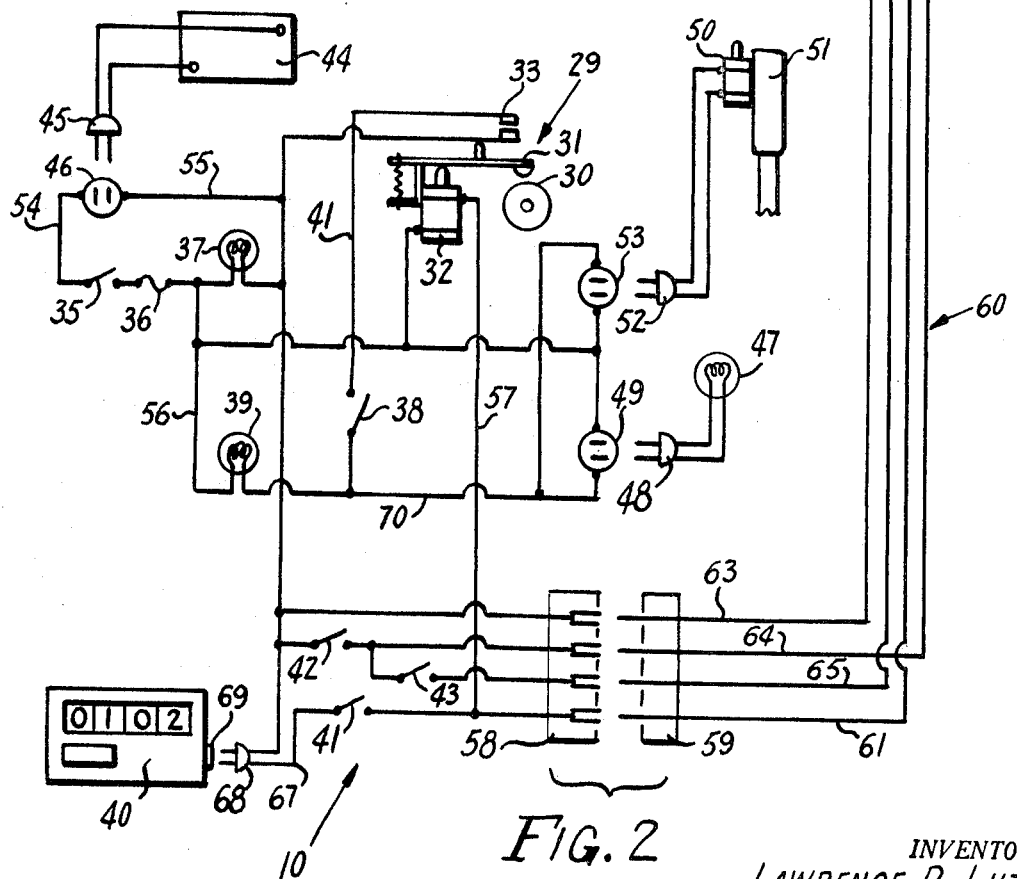
FIG. 2 is a semi-diagrammatic wiring diagram used with the invention.

Referring now to the circuit as illustrated in FIG. 2 a battery 44 is connected into the circuit by means of a plug 45 and receptacle 46. An extension indicator light 47 is connected into the circuit by means of a plug 48 and receptacle 49. An electrical vibrator 50 mounted on the control handle 51 of the crane 11 is connected into the circuit by means of a plug 2 and receptacle 53.

Following the circuit from the battery 44 the electricity flows through a conduit 54 to the switch 35, fuse 36 and indicator bulb 37 back through a conduit 55 to the receptacle 46. A conduit 56 extends from the fuse 36 to the lamp 39 and to the receptacles 49 and 53. The conduit 56 also extends to the solenoid 32 of the bell 29 and a conduit 57 extends from the solenoid 32 to the four way receptacle 58. A four way plug 59 is adapted to cooperate with the four way receptacle 58 and a four conductor cable indicated generally at 60 extends from the plug 59 to the cam operated switch housing 24. A conductor 61 extends from the plug 59 to a common wire 62 connected to each of the switches 25, 26, 27 and 28. A conductor 3 extends from the plug 59 to the switch 25. A conductor 64 extends from the plug 59 to the switch 26. A conductor 65 extends from the plug 59 to the common wire 66 extending to the switches 27 and 28.

The conductor 57 extends to the switch 41 and is connected by a conductor 67 to a plug 68 adapted to plug into a receptacle 69 in the counter 40. The conductor 55 also extends to the plug 68 to provide electricity to the counter 40. A conductor 70 extends from the lamp 39 to one side of the receptacle 49 and to one side of the receptacle 53. The conductor 70 also extends to the switch 38 and a conductor 71 connects the switch 38 to one side of the switch 33 the opposite side being connected to the conductor 55.

In the use and operation of the invention illustrated in FIGS. 1 through 6 the drive wheel 22 is in constant contact with the cable drum 12 so that it rotates each time the cable drum 12 rotates to rotate the cam 23 and actuate the witches 25, 26, 27 and 28.

When it is desired to have the signals in operation the battery 44 is pluged into the system with the plug 45 into the receptacle 46 and the switch 35 is closed. With the switch 35 closed current will flow through the switch 25 as it is closed on each revolution of the cam 23 and the solenoid 32 will be energized to ring the bell 29. Each ringing of the bell 29 indicates one revolution of the drive wheel 22 which in turn corresponds to a specific length of the cable 13. In event that additional signals are required the switch 38 is closed and the switch 33 is closed each time the bell 29 rings so as to illuminate the light 39 and if they are plugged in the light 47 and the vibrator 50. In some instances the operator of the equipment might not be able to hear the bell 9 and the additional signals will correct this problem. In the event that long lengths of the cable 13 are to be paid out the switch 41 can be closed to actuate the couner 40 to permit the operator to quickly lower the load 16 until nearly at the point of release from the cable 13 the switch 42 can be closed to energize the switch 26 so that two signals are given on each revolution of the cam 23 indicating half of the cable length as when only the switch 25 has been closed. If still more frequent signals are required switch 43 can be closed energizing the switches 27 and 28 so that four signals are given on each revolution of the cam 23. Obviously additional switches may be actuated by the cam to give even more frequent signals if this be desired.

It should be noted that the counter 40 is actually counting signals so in the case of the more frequent signals such as when the switches 42 and 43 are closed will actually register a count of four on each revolution instead of a count of one.

Figure 1:
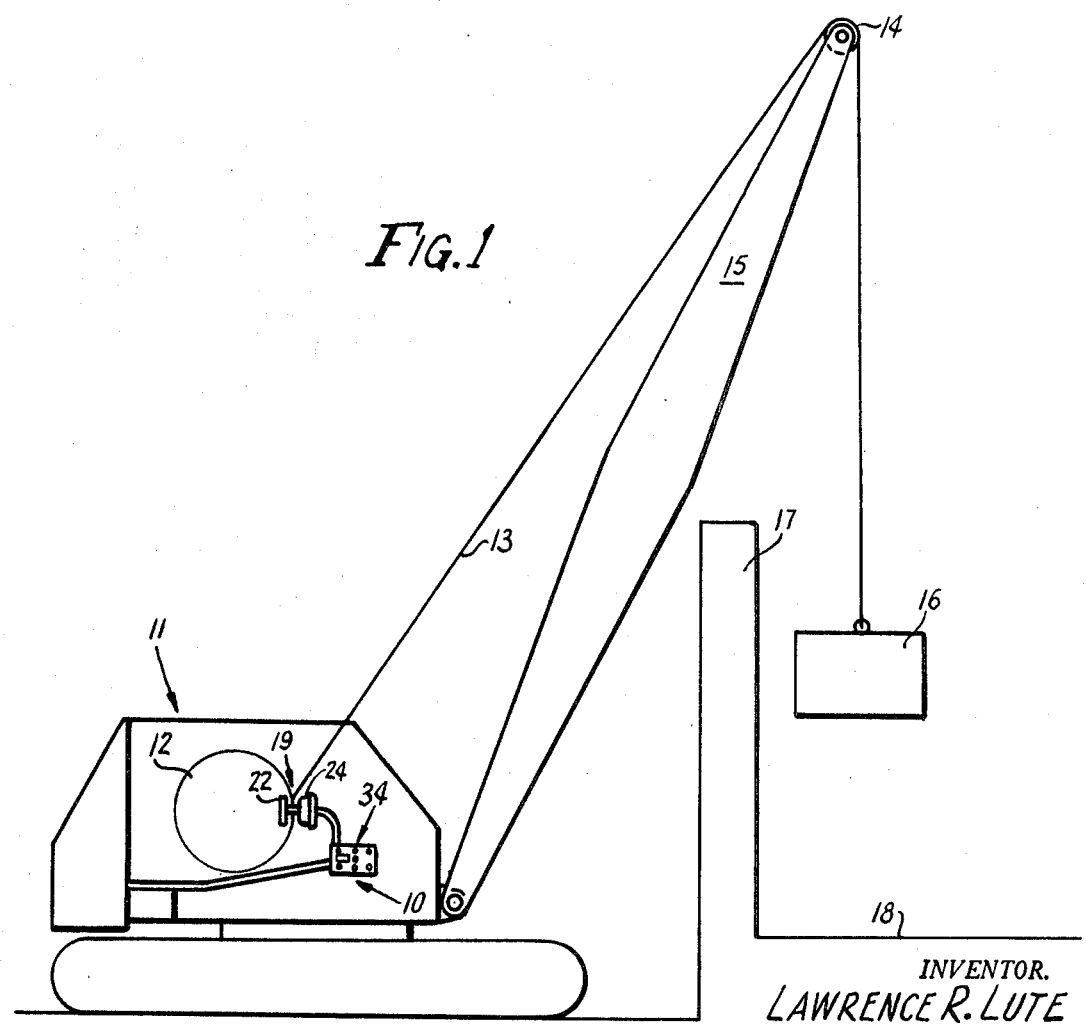
FIG. 1 is a side elevation of the invention.

With the indicator in operation the operator of the equipment can rapidly determine the length of cable required to be paid out in order to deposit the load on its final resting place and can then by using the signals quickly move the load to a point slightly removed from the final resting place and then slowly move it until it is released from the cable. This of course is possible even though the load is completely hidden behind the wall as illustrated in FIG. 1.

Figure 7:
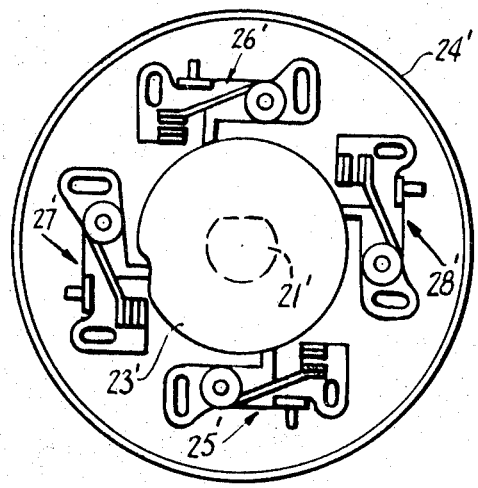
FIG. 7 is a plan view of a modified form of cam switch.

A modified form of cam switch is illustrated generally in FIG. 7 and is contained in a housing 24'. A cam 23' is positioned centrally of the housing 24' and is driven by the shaft 21' in the same manner as the shaft 21 is driven in the form of the invention illustrated in FIG. 3. A breaker switch generally indicated at 25' is positioned beneath the cam 23' and a breaker switch 26' is arranged in opposition thereto on the other side of the cam 23'. A breaker switch 27' is positioned midway between the breaker switches 25', 26' on one side of the cam 23' and a breaker switch 28' is positioned oppositely of the breaker switch 27'. The breaker switches 25', 26', 27' and 28' are wired into the circuit of FIG. 2 in place of the switches 25, 26, 27, and 28 illustrated therein. The use and operation of this form of the invention is identical to that of the preferred form of the invention.

Figure 8:
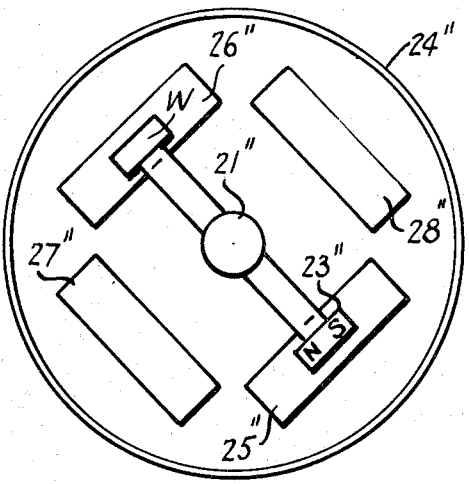
FIG. 8 is another modified form of switch used with the invention.

In FIG. 8 a magnetic rotary switch is indicated contained in a housing 24''. The magnetic rotary switch has a magnetically actuated switch 25'' and diametrically thereacross a magnetically actuated switch 26''. Intermediate the switches 25'', 26'' is a magnetically actuated switch 27'' and diametrically opposed thereto is a magnetically actuated switch 28''. The shaft 21'' extends into the housing 24'' and has a switch actuating magnet 23'' secured thereto in a position to be swung in a circle to actuate the switches 25'', 26'', 27'' and 28'' as it moves thereover. A counterweight W is positioned opposite the magnet 23'' to balance the magnet 23''. The switches 25'', 26'', 27'' and 28'' are wired into the circuit illustrated in FIG. 2 as replacements for the switches 25, 26, 27 and 28 when this is required. The use and operation of the modification illustrated in FIG. 8 is identical to that of the preferred form of the invention.

Figure 6:
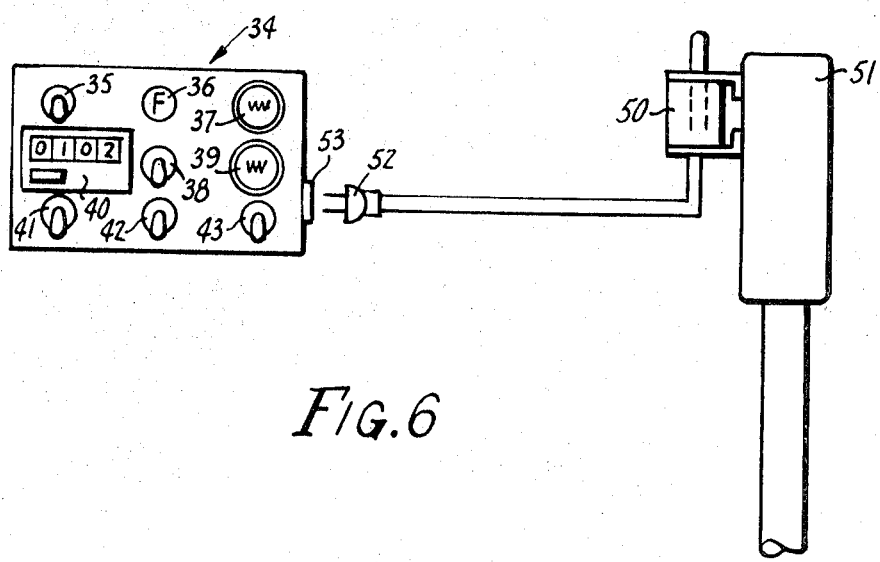
FIG. 6 is a front elevation of the control panel illustrating the connection of the vibrating indicator thereto.

The vibrator 50 illustrated in FIGS. 2 and 6 is mounted on an operating lever 51 of the crane 11 so as to vibrate the lever and cause a vibration in the hands of the operator should both the light and the bell fail to attract his attention.

In using the counter 40 the operator would determine from experience the count required to position the load at its final resting point and would reset the counter 40 after raising to clear the wall 17 and then lower the load until the count is nearly sufficient to deposit the load. Further lowering would then be signalled as described above.

Having thus described the preferred embodiments of the invention it should be understood that numerous structural modifications and adaptations may be resorted to without departing from the spirit of the invention.

I claim:

1. An electrical indicator for hand controlled equipment of the type including cable operated apparatus wherein the cable is wound and unwound from a drum comprising a rotary cam driven by the drum, a plurality of switch elements mounted for successive actuation by said cam on each rotation thereof, an electric bell for signalling the rotation of said winding drum, an electric circuit connecting said plurality of switch elements to said electric bell, a plurality of hand controlled switches for selectively connecting one or more of said plurality of switch elements to said electric bell through said electric circuit to energize said electric bell one or more times on each revolution of said rotary cam, a counter for counting each energization of said electric bell, means for selectively connecting said counter into said circuit, a signal lamp connected in said circuit, a signal vibrator connected in said circuit, and means actuated by said bell energizing said signal lamp and said vibrator each time said bell is energized.

2. A device as claimed in claim 1 wherein said plurality of switch elements comprises four circumferentially equi-spaced elements with said plurality of hand controlled switches adapted to energize said electric bell one, two or four times on each revolution of said cam.

3. A device as claimed in claim 2 wherein said vibrator is mounted on the hand controls of said hand control equipment.

* * * * *